(12) United States Patent
Dutto et al.

(10) Patent No.: US 6,264,023 B1
(45) Date of Patent: *Jul. 24, 2001

(54) BOTTLE EXTRACTOR FOR HOLLOW GLASS MOULDING MACHINES

(75) Inventors: Ivo Dutto, Llodio; Alfonso Arechaga, Alava; Antonio Aragon, Llodio, all of (ES)

(73) Assignees: Vidrala, S.A.; Avacon, S.A., both of (ES)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,531
(22) Filed: Mar. 12, 1999
(51) Int. Cl.$^7$ ..................................................... B25J 18/04
(52) U.S. Cl. .................. 198/739; 198/468.01; 414/744.2
(58) Field of Search ........................... 414/744.2, 749.1, 414/751.1, 752.1; 198/468.01, 739; 65/260; 901/15, 17, 22, 23

(56) References Cited

U.S. PATENT DOCUMENTS

| | | | |
|---|---|---|---|
| 4,378,959 | * | 4/1983 | Susnjara ............................. 901/15 X |
| 5,059,089 | * | 10/1991 | Kocaoglan ........................ 901/17 X |

* cited by examiner

Primary Examiner—Donald W. Underwood
(74) Attorney, Agent, or Firm—Bierman, Muserlian and Lucas

(57) ABSTRACT

Bottle extractor for hollow glass moulding machines, of the type that have bottle handling fingers comprising, a head joined to a fixed position spin axis and which includes at least one fluidic action cylinder, whose rod is joined to the fingers, the head having a mobile head supporting the fluidic action cylinder(s); a head base joined to the fixed position spin axis and nut-screw means to move the mobile head with respect to the head base.

4 Claims, 2 Drawing Sheets

BOTTLE EXTRACTOR FOR HOLLOW GLASS MOULDING MACHINES

In a bottle extractor, the different points of the surface of the rods that join head and handling fingers of the bottles, are exposed to the contaminating atmosphere with very different intensity, giving rise to problems in the operation.

The applicant has developed a bottle extractor, which maintains the same length of rod on the outside, under any circumstances, so the deterioration of the surface is even. Therefore, the head has been split into two parts, the head (itself) and head base. The head base remains in fixed position and the head moves as required by the user with respect to the head base, making a fixed amount of rod length stand out from the head during the work. All of this will be understood better with the drawings enclosed.

The bottle extractor for hollow glass moulding machines, of this invention, is of the type comprised of bottle handler fingers, a head joined to a fixed position spin axis and which includes at least one fluidic action cylinder, whose rod is joined to the fingers. It is characterised because the head is comprised of a mobile head supporting at least one fluidic action cylinder, a head base joined to the fixed position spin axis and means to move the mobile head with respect to the head base.

It is also characterised because the means to move the mobile head with respect to the head base are nut-screw elements, one of the elements being placed in the mobile head and the other in the head base.

It is also characterised because the mobile head is comprised of some flaps, which envelop the head base.

It is also characterised because it has a slip bushing, which channels the air from the shaft to the mobile head.

In order to have a better understanding of this invention, a special form of practical execution is shown on the drawings. This is susceptible to incidental changes, which will not alter the basics.

Figure 1:
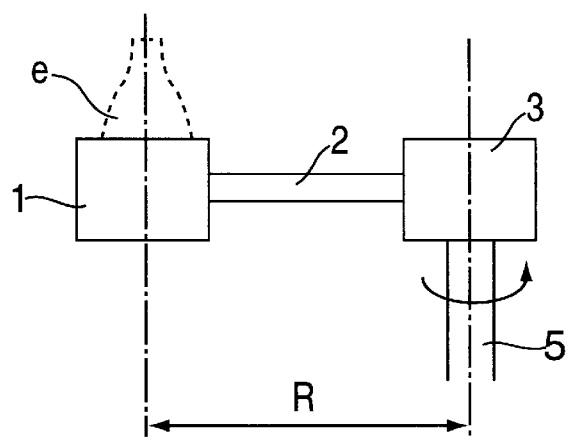
FIG. 1 is a diagram of an already known bottle extractor.

Below a non-limiting example of practical execution of this invention is described.

In a glass container (e) factory, for example bottles, the bottle extractor transfers the containers (e) from the bottle forming machine to the conveyor belt of the bottle transport system.

To do this the bottle extractor has some fingers (1) to catch the receptacles (e) to be moved, at least one arm (2) which is the rod of a fluidic cylinder and a head (3) which rotates with the shaft (5) to take the fingers (1) from the forming machine to the conveyor belt and deposit the containers there. It is considered that the shaft position (5) is fixed.

Each installation, each company, each container, etc. means that the distance (R) between the fingers (1) and the shaft (5) has to be modified, which is achieved by making the rods (2) stand out different distances from the head (3). To do this there is an internal device in the head (3), which limits the stroke of the rods (2) making the part of the rod (2) that stands out on the outside variable.

This outside exposure variability of the rod (2) means that the wear, dirt or corrosion on its surface (and if fitting on its guide) is not even, which in turn means that when the user wishes to adapt the extractor to other circumstances, that is, vary the distance (R) between the shaft (5) and the fingers (1), the movement/sliding of the rod (2) in the head (3) is imperfect.

Figure 2:
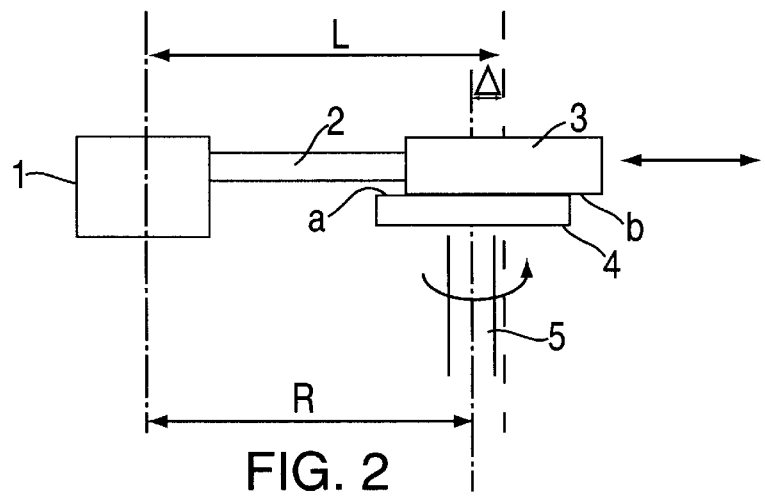
FIG. 2 is a diagram of the bottle extractor, object of the invention.

In the extractor of the invention (FIG. 2) the distance (1) between the fingers (1) and the head (3) (itself, which is mobile) is fixed, which is achieved with a fixed movement of the rod (2), for example, the maximum stroke of the cylinder, which gives rise to an even wear/dirt on the whole surface.

To get the extractor to adapt to the need for the distance (R) between the fingers (1) and the shaft (5) (whose position is still fixed) to be variable, joined to the shaft (5) there is a head base (4) and means to move the head (3) (itself and which is mobile) respect to the head base (4), a variable amount (Δ) so that:

$$R = 1 \pm \Delta$$

Figure 3:
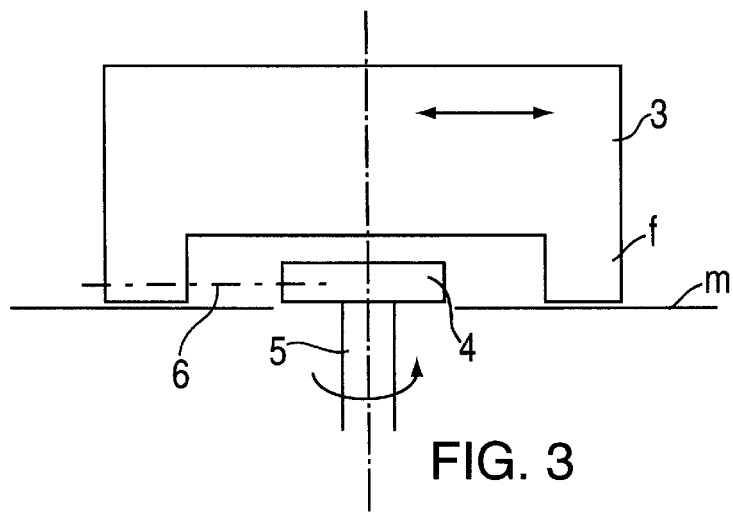
FIG. 3 is a diagram of a practical execution of the bottle extractor of FIG. 2.

In order not to expose the movement means and the areas (a), (b) of the mobile head (3) and head base (4), which are not face to face, to the contaminating atmosphere, it has been arranged (FIG. 3) for the head (3) to envelop the head base (4) with some flaps (f) which are close to the working table (m). As displacement means there is a worm screw (6) on one of the flaps (f), rotating in it freely, whilst the head base (4) acts as thread, so that when the distance (R) between fingers (1) and shaft (5) is wished to be varied, the worm screw (6) is rotated, for example manually, which gives rise to a displacement (Δ) of the mobile head (3) with respect to the shaft (5) or in other words, of the fingers (1) with respect to the shaft (5).

Figure 4:
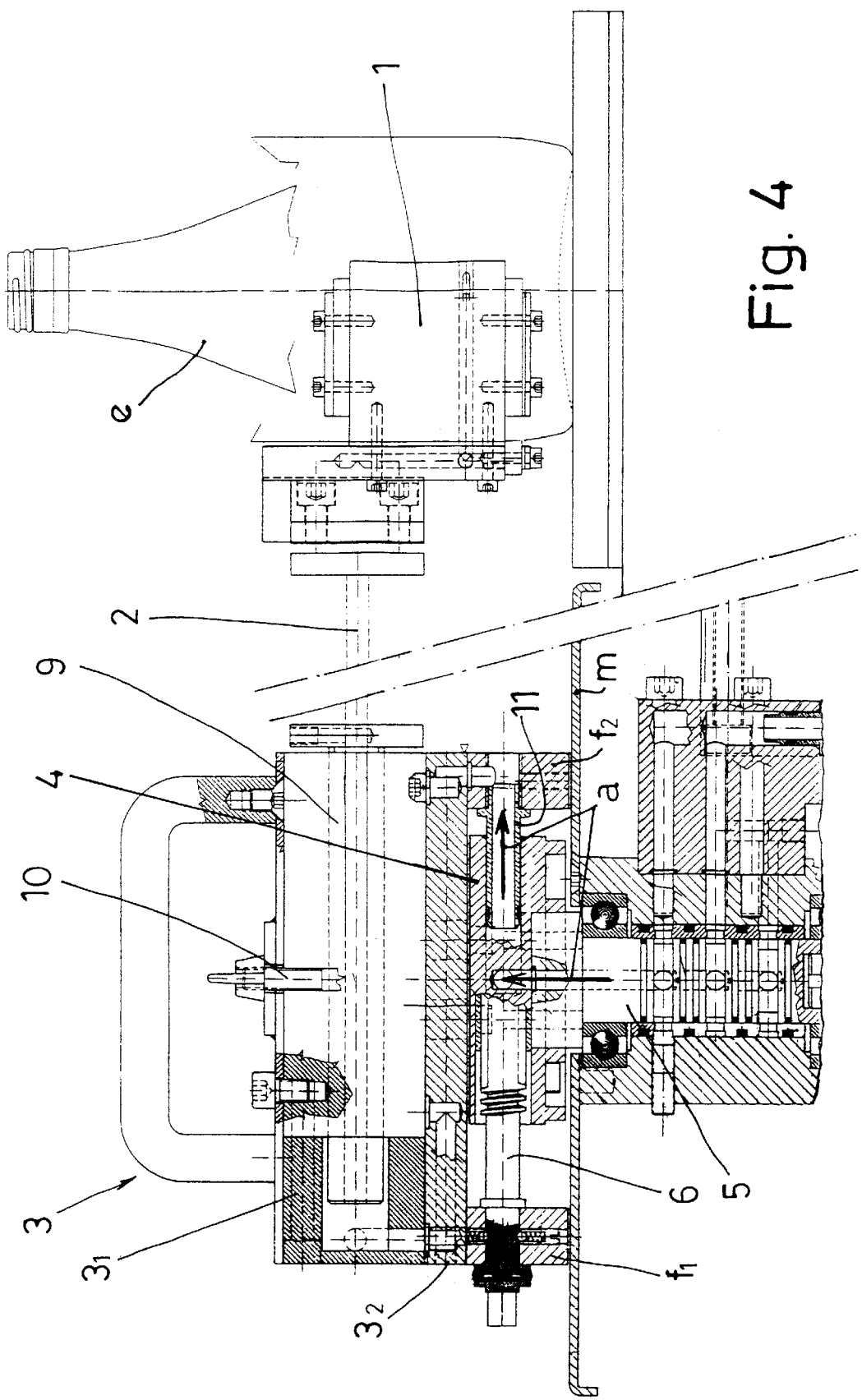
FIG. 4 is a longitudinal section of a bottle extractor carried out in accordance with the diagram of FIG. 3.

In FIG. 4 the head (3) has been broken down into an upper part ($3_1$), an intermediate part ($3_2$) and flaps (f) for engineering and production reasons.

As the cylinders (9) easily become deteriorated, access to them has been made easy, so the union between the upper part ($3_1$), cylinder supporting device (9) and the intermediate part ($3_2$) be butt-to-butt with external grip and conventional means (10).

The worm screw (6) is placed in a flap ($f_1$) and is prolonged to the base of the head (4) which acts as a nut.

At least one slip bushing (11), which channels the air (a) from the shaft (5) to the mobile head (3) has preferably been placed coaxial to the worm screw (6) and between the head base (4) and the flap of the other side ($f_2$).

What is claimed is:

1. In a bottle extractor for hollow glass moulding machines, of the type comprised of bottle handling fingers, a head joined to a vertically oriented, fixed position spin axis shaft and which includes at least one horizontally oriented fluidic action cylinder, whose rod is joined at one end to the fingers, the improvement characterised in that the head is comprised of a mobile head supporting the at least one fluidic action cylinder, a head base fixed on top of a horizontally oriented table, said table fixed on top of the fixed position spin axis shaft, said head base positioned vertically above said shaft and said mobile head positioned vertically above said head base, said mobile head enveloping said head base, means for moving the mobile head horizontally with respect to the head base, said means for moving said mobile head positioned in said head base and said mobile head, said mobile head and said table protecting said means for moving from a contaminating atmosphere of said hollow glass moulding machine, said at least one fluidic shaft is affixed to said mobile head and horizontally oriented and said rod of said at least one fluidic action cylinder extends horizontally outward from said moble head and said rod fixed such that the distance between the fingers and the mobile head is fixed.

2. The bottle extractor according to claim 1, characterised in that the means for moving the mobile head with respect to the head base are nut-screw elements, the screw element positioned in the mobile head and the nut element positioned in the head base.

3. The bottle extractor according to claim 1, characterised in that the mobile head is comprised of flaps which envelop the head base.

4. The bottle extractor according to claim 1, characterised in that said head has a slip bushing which channels air from the shaft to the mobile head.

* * * * *